3,194,703

METHOD OF TREATING BODIES OF SEMICONDUCTIVE MATERIAL BY CHEMICALLY ETCHING WITH AN ACID ETCHING LIQUID

Jan Bloem, Nijmegen, Netherlands, assignor to North American Philips Company, Inc., New York, N.Y., a corporation of Delaware No Drawing. Filed June 29, 1962, Ser. No. 206,147
Claims priority, application Netherlands, July 5, 1961, 266,733
3 Claims. (Cl. 156—17)

The invention relates to a method of treating semiconductor bodies by chemically etching with an acid etching liquid which contains hydrofluoric acid and at least one oxidizing agent. Such semiconductor bodies are used, for example, in semiconductor electrode systems, such as transistors, crystal diodes and photoelectric cells.

When manufacturing such electrode systems, the semiconductor bodies used are generally subjected to etching treatments, for example to give the body the required thickness, to remove certain portions, to clean the surface of the body or to polish a rough surface. Such etching treatments may be applied to such semiconductor body both before and after providing the electrodes. The above etching liquids may contain as oxidizing agent, for example, nitric acid and/or hydrogen peroxide, if desired combined with a little bromine or iodine.

Processes of chemically etching semiconductor bodies should not be confused with processes of electro-chemically etching semi-conductor bodies, the latter processes requiring the use of electrodes in an etching liquid, one of which may be constituted by the semiconductor body to be treated, an electrical potential difference between the electrodes being applied from the exterior, whereas chemical etching requires the immersion of a semiconductor body in an etching liquid only. Liquids of quite different constitution are chosen for the two processes, the liquids for the electroyltic etching processes normally being not able to attack the semiconductor body without the application of electrodes and a potential difference between said electrodes.

When using high concentrations of oxidizing agents and hydrofluoric acid in the etching liquids, etching occurs rapidly and is consequently less reproducible. Therefore, often dilute aqueous solutions were used to cause the etching treatment to occur more slowly and in a better reproducible manner. However, it has appeared that the surface of the treated body often showed irregularities, for example etching pits, and could even be comparatively rough. Such irregularities in the surface may have a disturbing effect on the further treatment of the semiconductor body for manufacturing semiconductor electrode systems, for example when diffusing action impurities, and may in addition be less favourable for the properties of such an electrode system. It has already been proposed to dilute etching liquids, which have been obtained by mixing concentrated nitric acid and concentrated hydrofluoric acid, with glacial acetic acid instead of with water. It appeared that the possibility of etching pits occurring had decreased somewhat but in the case of strong dilutions with glacial acetic acid, the etching rate of this etching liquid decreases discontinuously to extremely low values when increasing the dilution.

The object of the invention is to provide an etching liquid which does not have the above drawbacks.

According to the invention, the etching liquid contains sulphuric acid. It has appeared that the presence of the sulfuric acid counteracts the occurrence of etching pits and the roughening of the surface.

The way in which the presence of sulfuric acid inhibits surface roughening is not fully understood, but it may be that sulphuric acid interferes with the corrosive action of the liquid due to the presence of water in it by binding water chemically and thus inactivating it for corrosive action.

Sulphuric acid may be added, for example, in the form of concentrated sulphuric acid to any desired percentage. Preferably the etching liquid contains at least 30% by weight of sulphuric acid. In practice, preferably a sulphuric acid content of at least 60% and at most 85% is used for improving reproducibility of the thickness reduction without reducing the etching rate to a less practical low value.

Just as for the known etching liquids, it holds that the rate at which the liquid etches is also dependent on the ratio between the quantities of the oxidizing agent and of the hydrofluoric acid in this liquid. If the etching liquid consists of hydrogen peroxide, hydrofluoric acid, sulfuric acid and water, the content of hydrogen peroxide preferably is at least 50% by weight and at most 150% by weight with reference to the quantity by weight of hydrofluoric acid used in the etching liquid. The content of hydrofluoric acid with reference to the quantity of water used in the etching liquid preferably is at least 10% by weight.

In order that the invention may readily be carried into effect, it will be now described more fully, by way of example, with reference to the table below, enumerating examples of etching liquids and their action upon plate-shaped germanium bodies at a temperature of 25° C. The germanium bodies had been obtained by sawing from a mono-crystalline germanium rod in directions at right angles to a <111>-axis followed by mechanical grinding to a thickness of 250$\mu$, in which a somewhat rough surface is formed. All the etching liquids have been obtained by mixing a 48% aqueous solution of hydrofluoric acid, a 30% aqueous solution a hydrogen peroxide and concentrated sulphuric acid (96%). The decrease in thickness per minute stated in the table relates to a decrease in thickness by the action of the etching liquid on oppositely located surfaces of germanium bodies.

*Table*

| Etching liquid | Parts by vol. of HF-solution | Parts by vol. of $H_2O_2$-solution | Parts by vol. of concentrated $H_2SO_4$ | Percent by weight of $H_2O$ | Percent by weight of HF | Percent by weight of $H_2O_2$ | Percent by weight of $H_2SO_4$ | Decrease in thickness in $\mu$/min. |
|---|---|---|---|---|---|---|---|---|
| A | 1 | 2 | 1 | 42.7 | 10.6 | 12.7 | 34.0 | 43 |
| B | 1 | 2 | 2 | 32.7 | 7.8 | 9.3 | 50.2 | 32 |
| C | 1 | 2 | 4 | 22.7 | 5.1 | 6.2 | 66.0 | 10 |
| D | 1 | 2 | 6 | 17.9 | 3.8 | 4.6 | 73.7 | 6 |
| E | 1 | 2 | 8 | 15.1 | 3.0 | 3.6 | 78.3 | 5 |
| F | 1 | 2 | 10 | 13.2 | 2.5 | 3.0 | 81.3 | 3 |
| G | 1 | 1 | 4 | 17.3 | 5.7 | 3.4 | 73.6 | 8 |

It is noted that it has appeared that the decrease in thickness per minute as stated in the table is not dependent on the conductivity type of the specific conductivity of the body. It has also appeared that the decrease in thickness per minute is larger at higher temperatures, namely increases approximately by 6% per ° C.

Smooth surfaces were obtained using the freshly prepared etching liquids stated in the above table. The comparatively rapid etching liquids A and B give a noticeable rounding of the sharp edges of the threated bodies. The etching liquids C and G give better reproducible results and no rounding of sharp edges.

For good comparison in the above table, etching liquids were mentioned by way of example which contained hydrogen peroxide as the oxidizing agent, while the etching effect is indicated with respect to germanium bodies. However, the invention is not restricted to the use of hydrogen peroxide or to the etching of germanium bodies. For example, for silicon bodies also etching liquids may be used which contain one or more oxidizing agents, hydrofluoric acid and sulphuric acid.

What is claimed is:

1. In the manufacture of a semiconductor device, a method of chemically etching a semiconductive body selected from the group consisting of germanium and silicon, comprising the step of subjecting a surface portion of the said body to the etching action of an acid etching aqueous solution containing hydrofluoric acid, at least one oxidizing agent selected from the group consisting of hydrogen peroxide and nitric acid, and further containing between about 60% by weight and 85% by weight of sulphuric acid.

2. The method set in claim 1 wherein the hydrofluoric acid content of the aqueous solution is at least 10% by weight of the water content of the aqueous solution.

3. The method set forth in claim 2 wherein the oxidizing agent content of the aqueous solution is at least 50% by weight of the quantity by weight of the hydrofluoric acid content of the solution.

References Cited by the Examiner

UNITED STATES PATENTS

| | | | |
|---|---|---|---|
| 1,777,321 | 10/30 | Meth | 252—79.3 XR |
| 2,337,062 | 12/43 | Page | 156—18 XR |
| 2,542,727 | 2/51 | Theurer | 156—17 |
| 2,847,287 | 8/58 | Landgren | 156—18 XR |
| 2,860,039 | 11/58 | Margulies | 156—18 |

EARL M. BERGERT, *Primary Examiner.*

JOSEPH STEINBERG, *Examiner.*